United States Patent
Strogov et al.

(10) Patent No.: US 12,130,918 B2
(45) Date of Patent: Oct. 29, 2024

(54) SYSTEM AND METHOD OF BACKUP SLICE CONTROL FOR RECOVERING DATA ARCHIVES

(71) Applicant: Acronis International GmbH, Schaffhausen (CH)

(72) Inventors: Vladimir Strogov, Singapore (SG); Serguei Beloussov, Singapore (SG); Stanislav Protasov, Singapore (SG)

(73) Assignee: Acronis International GmbH, Shaffhausen (CH)

( * ) Notice: Subject to any disclaimer, the term of this patent is extended or adjusted under 35 U.S.C. 154(b) by 406 days.

(21) Appl. No.: 17/646,484

(22) Filed: Dec. 30, 2021

(65) Prior Publication Data

US 2023/0214486 A1 Jul. 6, 2023

(51) Int. Cl.
*G06F 21/56* (2013.01)
*G06F 11/14* (2006.01)

(52) U.S. Cl.
CPC ........ *G06F 21/561* (2013.01); *G06F 11/1469* (2013.01); *G06F 2201/84* (2013.01); *G06F 2221/034* (2013.01)

(58) Field of Classification Search
CPC ............ G06F 11/1448; G06F 11/1451; G06F 11/1453; G06F 11/1458; G06F 11/1461; G06F 11/1464; G06F 11/1469; G06F 21/56; G06F 21/568; G06F 2201/84; G06F 21/566
See application file for complete search history.

(56) References Cited

U.S. PATENT DOCUMENTS

| | | | |
|---|---|---|---|
| 8,407,795 B2 | 3/2013 | Palagummi | |
| 8,495,037 B1 | 7/2013 | Westenberg | |
| 8,607,342 B1 | 12/2013 | Liao et al. | |
| 9,990,497 B2 | 6/2018 | Spernow et al. | |
| 11,126,506 B2 | 9/2021 | Martynov et al. | |
| 11,328,061 B2 | 5/2022 | Strogov et al. | |
| 11,562,067 B2 | 1/2023 | Strogov et al. | |
| 2011/0197279 A1 | 8/2011 | Ueoka | |
| 2012/0124007 A1* | 5/2012 | Sten | G06F 11/1448 707/685 |
| 2013/0091571 A1* | 4/2013 | Lu | G06F 21/566 726/23 |
| 2019/0155695 A1 | 5/2019 | Protasov et al. | |
| 2021/0014243 A1 | 1/2021 | Kulaga et al. | |
| 2021/0019404 A1 | 1/2021 | Strogov et al. | |
| 2021/0200866 A1 | 7/2021 | Strogov et al. | |

FOREIGN PATENT DOCUMENTS

RU 2622630 C2 6/2017

* cited by examiner

*Primary Examiner* — Olugbenga O Idowu
(74) *Attorney, Agent, or Firm* — ESPE Legal Consultancy FZ-LLC

(57) ABSTRACT

The invention relates to data recovery technology. An archive connection driver creates a virtual storage medium that is readable by an operating system, with the operating system running antivirus scanning algorithms on the connected virtual storage medium. Corrupted data and malware are deleted and the relevant data blocks repaired in a connected backup. Corrupted data and infected files are restored in marked invalid data in the backup.

20 Claims, 3 Drawing Sheets

SYSTEM AND METHOD OF BACKUP SLICE CONTROL FOR RECOVERING DATA ARCHIVES

FIELD OF THE INVENTION

The invention relates to data recovery technology, more specifically to systems and methods for recovering from a clean backup that is protected from malware after data corruption as a result of a virus attack.

BACKGROUND OF THE INVENTION

Antivirus software detects infected systems, removes malware and recovers damaged data. The data recovery procedure must ensure that the data is extracted from a backup that was created before the malware (software) attack took place. To securely fix valid and reliable backups, an algorithm is needed to identify in the chain of regular user backups the versions that have not been affected by a malware attack. Such an algorithm implements a method that allows for the separation of valid and reliable backups that have not been attacked or affected by malware.

At the same time, it must be borne in mind that the data that has been changed or added at later intervals after this backup has been created may be compromised and cannot be used. Consequently, antivirus software and data backup software must work together to perform the identification of valid and reliable backup versions. Such backups were created before the change or addition of malware and as close as possible to when the malware attack was detected. This ensures that the system will restore the latest copy of the data, free of virus and malware.

In large organizations and companies, data changes frequently, which makes this problem much more challenging. In addition, the number of backups is quite high because hundreds or thousands of servers regularly back up their data. Even a day or two difference between a backup and an attack can have a significant impact on the relevance of data files, documents, databases, etc.

An alternative to the claimed solution is the technical solution under U.S. Pat. No. 9,990,497B2 dated 5 Jun. 2018, MPC G06F 21/55; G06F21/56; H04L29/06, "Method to scan a forensic image of a computer system with multiple malicious code detection engines simultaneously from a master control point." The invention relates to methods of scanning malicious code with the simultaneous application of malware scanning algorithms from various antivirus vendors and several different antivirus engines for checking datasets from a memory device. The method includes at least a dataset from a memory device and the creation of a single dataset image to be examined. The data recovery algorithms are applied to a dataset to obtain a recovered dataset. An image of a dataset to be examined is scanned using a selected set of antivirus scanning engines. Each of the antivirus scan engines is installed in independent operating systems or in a virtual operating system. The antivirus scan engines simultaneously process an image of the dataset to be examined and form a single recovered dataset. A report is generated containing details of the malware found and the results of data recovery after scanning.

The benefit of the known technical solution is the use of a cloud environment to run several virtual operating systems. Each of the virtual operating systems is configured to run around thirty-two antivirus scan engines from different antivirus vendors. Each of the antivirus engines performs the check of the dataset image to be examined via a virtual media connection interface.

A disadvantage of such alternatives is the lack of means to help identify at what point in time the data corruption occurred. It is therefore not possible to determine the data validity in the dataset image repository to be examined Thus, after data recovery, only the user can evaluate the validity and completeness of the recovered data.

The invention RU2622630C2, dated 16 Jun. 2017, MPC G06F 21/56; G06F 21/60; G06F 12/16, "System and method for recovery of modified data," relating to antivirus technology, and more specifically to systems and methods for recovery of data modified by malware, is known. The invention solves the problem of increasing data storage security by backing up modified data and subsequently restoring previously modified data.

This system benefits from a modified data recovery system that contains an activity tracker designed to intercept requests from the process to modify data. The process parameters whose request has been intercepted are defined. The parameters of intercepted requests are defined. Certain process parameters are transmitted to the detection tool and parameters of intercepted requests to the analysis tool. An analysis tool designed to generate and transmit a backup request to the backup database of process-modifiable data to the backup database. The detection tool analyses the process parameters received from the activity tracker to determine the level of threat to the integrity of the process data it is modifying. A request to the backup tool is generated and transmitted to restore the process-modified data from the backup database, based on the results of the analysis. The operation of the process based on the results of the analysis is blocked. On request, the analysis tool restores previously copied data from the backup database.

However, this solution has the essential disadvantage that the backup databases can also be corrupted by malware attacks. The operation of the modified data recovery system may therefore be blocked.

The proposed system and method have an advantage over known counterparts because they do not have the disadvantages mentioned above.

SUMMARY OF THE INVENTION

The invention protects data from unauthorized changes and ensures that backups are reliable and complete.

The technical result of the invention is to increase data storage security by backing up modified data and controlling the validity and completeness of the backups.

Data on a medium can be characterized by qualitative properties: reliability, completeness, accuracy, relevance, usefulness, value, timeliness, comprehensibility, accessibility, and conciseness.

The following technical features of the data on the data storage medium are essential for understanding the claimed technical result:

Data validity is the property of data and the information encoded in it not to have hidden errors. Valid data can become invalid over time if it becomes outdated and no longer accurately reflects actual operations, for example as a result of unauthorized access and modification. Data can become invalid for the following reasons: intentional distortion (misinformation); unintentional distortion of a subjective nature; or distortion due to the effects of malicious software. Data completeness is the property of data and the information encoded in it to characterize the displayed object or process in a comprehensive way for a given consumer. Data is complete if it is sufficient to understand and make decisions. Incomplete data may lead to an erroneous conclusion or decision. The completeness of the data on the data storage medium may be compromised by corruption caused by malware.

The claimed technical result is achieved by carrying out the steps of the backup control method, through which a connection is made via an archive connection driver using an archive connection interface to a backup located on a local data storage medium or in the cloud and the archive connection driver creates a virtual storage medium that is readable by the standard means of the operating system, with the operating system running antivirus scanning algorithms on the connected virtual storage medium. The virtual storage medium comprises a plurality of backup slices. Backup slices from past system states are also referred to as historical backup slices. The most recent backup slice is also known as the current backup slice.

If an antivirus check finds data with malware in the connected backup, the corrupted data and malware will be deleted and the relevant data blocks will be repaired in the connected backup. The backup is created with the ability to detect the sequence of changes made to data blocks by using a block map, with the files consisting of such blocks, and by tracking the sequence of block changes, it ensures that only changed files are scanned by the antivirus engine.

An antivirus check of earlier changes made to the backup is performed to detect a backup that shows no evidence of malware infection, and in subsequent backups and subsequent slices of backups the data blocks, the use of which for the data recovery is unacceptable, are marked as invalid.

All marked invalid data is restored in the backup to the data contained in the detected backup, with no evidence of malware infection, by fully copying valid data from the data blocks, in which case, if data cannot be restored from previous slices of the backup, the data is restored from the valid system image from which the system was deployed, or if such an image is not available, the data is restored from distributions, including the operating system distribution.

Corrupted data and infected files are restored in marked invalid data in the backup, thus ensuring the validity and completeness of the backup.

In this case, the archive is a chain of data grouped into a summary dataset that is processed when the files are backed up under the control of a separate backup task.

A backup slice consists of sets of files that are created in a single loop from the time an individual backup task is started until it is completed. The number of backup slices created equals the number of runs per backup task. The backup slice is used to restore the state of the files to the point in time when the backup slice was created.

A media volume is an archive backup file with a *.tib extension that contains slices of backups. Each backup slice consists of at least one or more media volumes. If the backup task settings are set to split an archive file, the backup slice to be created is split into several files. In doing so, the files created are multiple volumes of the backup slice.

In one embodiment, the archive connection driver creates a virtual storage medium using a backup slice.

DETAILED DESCRIPTION

In various embodiments of the invention or the examples shown in the description, specific systems may be implemented in numerous ways involving a system, process, device, user interface or sequence of program commands on a machine-readable medium or on a network of computers where program commands are routed via optical, electronic or wireless communication channels. In general, the steps of the methods can be carried out in any order to implement the invention, unless the claims state otherwise.

Figure 1:
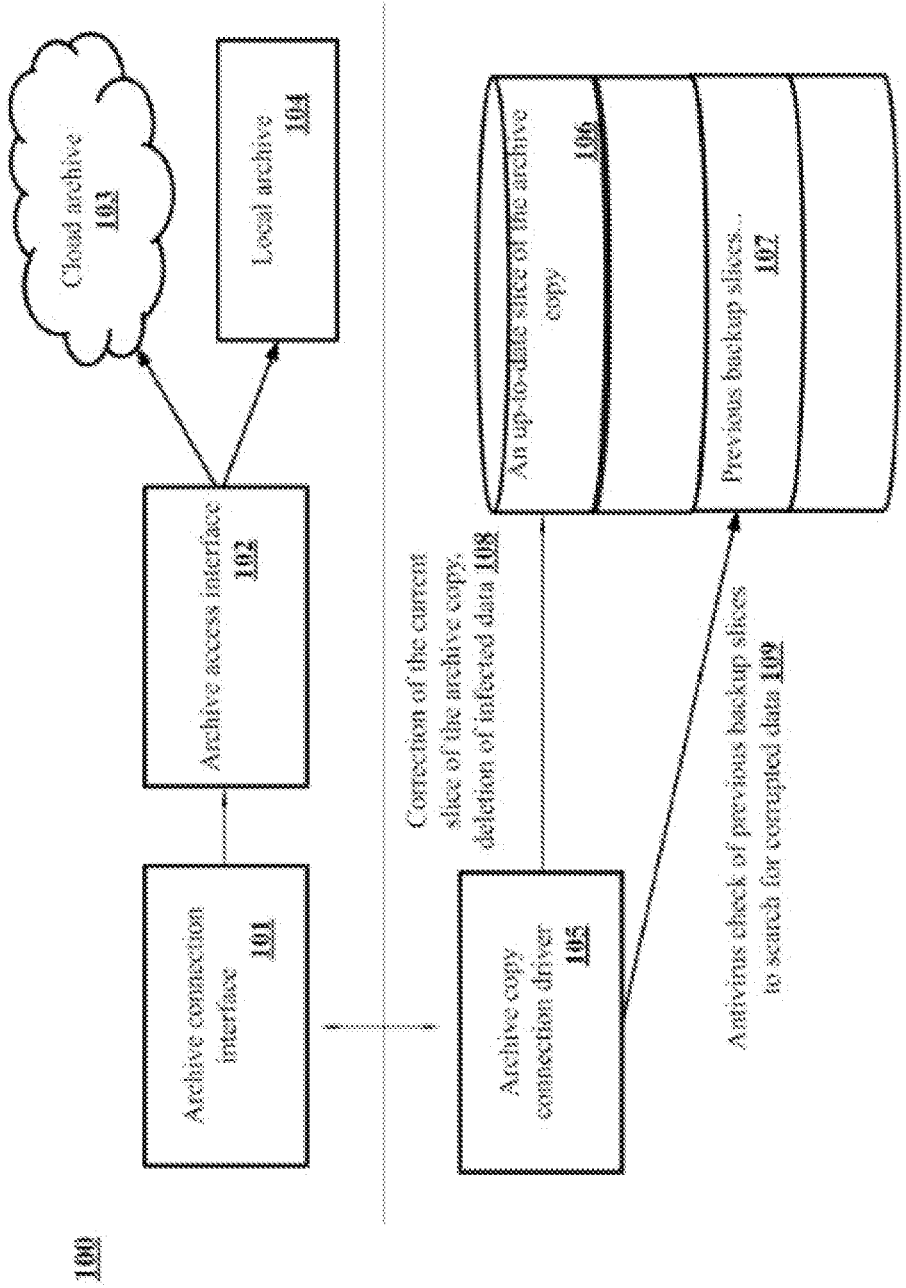
FIG. 1—shows a schematic diagram of a system for increasing the security of data storage by backing up modified data.

According to FIG. 1, the system 100 for improving data storage security by backing up modified data comprises a computing device in which a scheduled backup task is performed. The backup archive is stored in the cloud service as a cloud archive 103 or on local media as a local archive 104.

During a single backup task, a slice of backup 106, 107 is generated which consists of sets of files. The backup slice copy is used to restore files to the state at the time the backup slice was created, if necessary. Backup slices 107 correspond to historical backup slices while backup slice 106 represents a current backup slice.

System 100 enhances data storage security by backing up modified data, contains an archive access interface 102, and an archive connection interface 101. The archive connection driver 105 uses the archive connection interface 101 and creates a virtual storage medium that can be read by standard operating system tools. The operating system performs antivirus scanning algorithms on 109 connected virtual media.

If the antivirus check 109 finds data with malware in the connected backup 106, 107, the corrupted data and malware 108 will be deleted and the relevant data blocks will be repaired in the connected backup.

In one embodiment, the system 100 enhances data storage security through backup by searching for a clean recovery point, i.e., a slice of the backup that shows no evidence of malware infection in the system.

An antivirus check of earlier changes made to the historical backup slices 107 is performed to detect a backup that shows no evidence of malware infection, and in subsequent backups and subsequent slices of backups the data blocks, the use of which for the data recovery is unacceptable, are marked as invalid.

The archive connection driver 105 restores all marked invalid data in the backup 106 to the data contained in the detected backup, with no evidence of malware infection 107, by fully copying the valid data from the data blocks 108. In this case, if data cannot be restored from previous backup slices, the data is restored from a valid system image from which the system was deployed, or, if no such image exists, data is restored from distributions, including the operating system distribution.

In one embodiment of the invention, the archive connection driver 105 corrects all corrupted data and infected files in all marked invalid data in the backup 108, thus ensuring the validity and completeness of the backup.

In one embodiment, the data backup agent performs the task of backing up user data according to a predefined schedule or when requested to perform another backup. The backup agent backs up the data blocks that make up the files and saves a slice of the backup to the cloud archive 103 or to the local archive 104. A backup slice can be made by adding only the modified data blocks that have been made since the previous backup task was performed to the archive. The backup slice thus predominantly contains the data of the information blocks that have been modified. If it is necessary to restore these data blocks and user files that have not been modified, the relevant data areas are retrieved from previous backups, up to the original backup, which stores the status of the files and data blocks at the time the backup task was first performed.

In one embodiment, a data backup agent is implemented with the ability to detect malware on a device using updated antivirus databases, with infected blocks marked as invalid and excluded from backups, while restoring the marked invalid data in the backup with the data contained in the detected backup with no evidence of malware infection, by fully copying the valid data from the block.

Thus, in order to restore all the data, the whole chain of backup slices where such incremental data is stored would be required.

In this way, a system snapshot stored in a backup slice allows you to track down such changed blocks of data and changed files that have been altered by a malicious application attack or a virus attack.

The antivirus application performs an antivirus check and detects and prevents a virus attack or the execution of a malicious application. As the antivirus application accesses the backup slice via the backup driver 105, the antivirus application then uses standard operating system tools to access files and data blocks. If malware is detected and successfully removed, the relevant fixes will automatically be applied to the backup slice via the archive connection driver 105.

In one embodiment of the invention, malware can be detected by comparing file and data block changes that occur over time. In this case, the archive connection driver 105 provides the ability to establish the exact time of the malware's initial occurrence on system 100. This is possible because each slice of the backup contains checksums of each file in the file list and captures any changes made to the data blocks. If a backup slice contains indications that a malware attack has started, the archive connection driver 105 marks the closest backup slice that has not been affected by malware changes and uses that backup slice for the purpose of restoring data from the backup.

In this way, lists of modified files, checksums of modified files and timestamps of backup slices can identify precisely when a malware attack occurred and reveal the list of files and data blocks that may have been corrupted by the attack.

Figure 2:
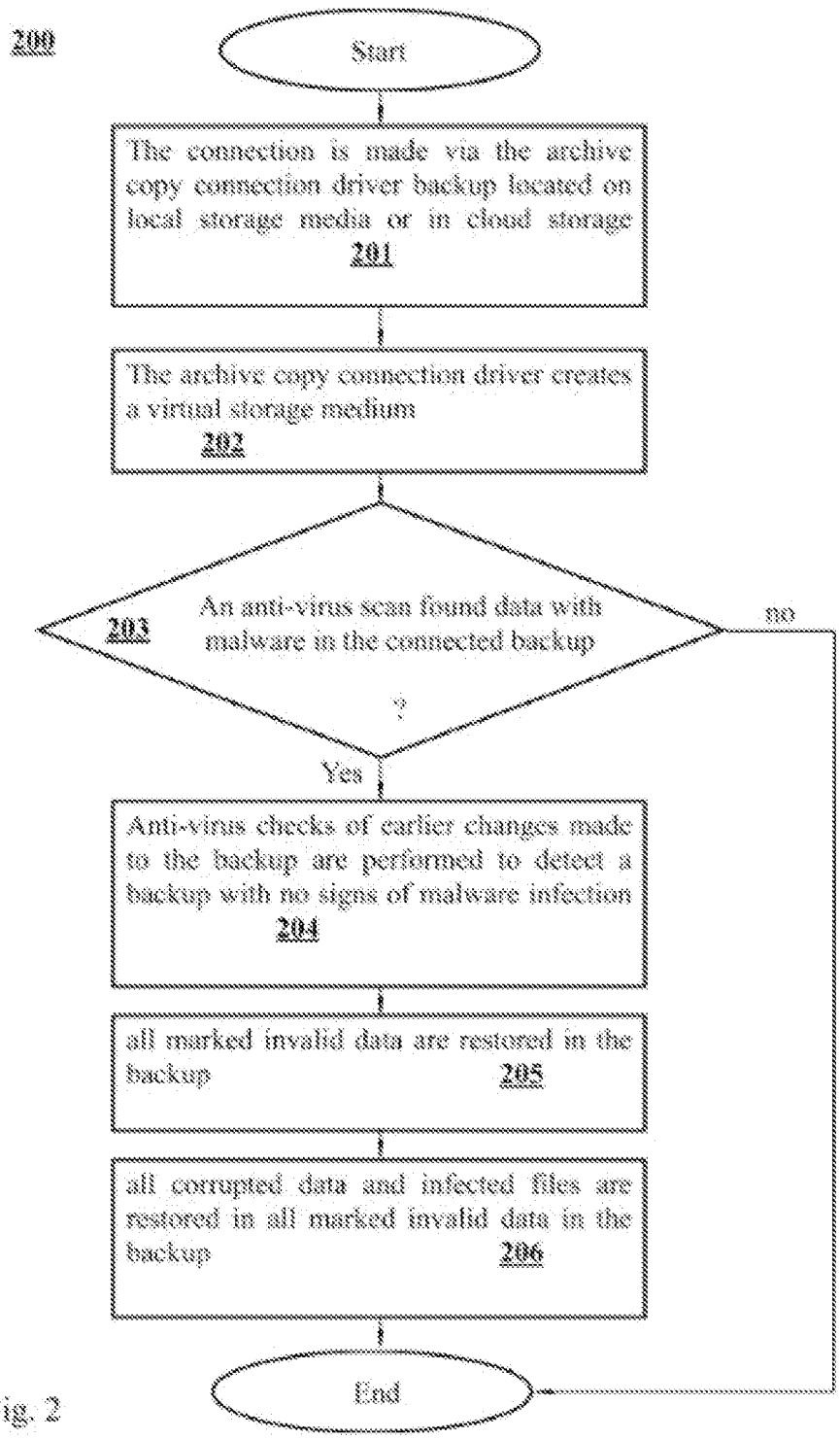
FIG. 2—shows a flowchart of the way to increase the security of data storage by backing up modified data.

According to the flowchart in FIG. 2, the method of improving data storage security by backing up modified data involves the following steps.

The connection is made via an archive connection driver backup located on local storage medium or in cloud storage at step 201.

The archive connection driver of 105 of FIG. 1 creates, using the archive connection interface 101, a virtual storage medium at step 202 which is readable by the standard means of the operating system, with the operating system running antivirus scanning algorithms on the connected virtual storage medium.

If an antivirus check finds the data with malware at step 203 in the connected backup, the corrupted data and malware will be deleted and the relevant data blocks will be repaired in the connected backup.

At step 204 an antivirus check of earlier changes made to the backup is performed to detect a backup that shows no evidence of malware infection, and in subsequent backups and subsequent slices of backups the data blocks, the use of which for the data recovery is unacceptable, are marked as invalid.

At the step 205 all marked invalid data is restored in the backup to the data contained in the detected backup, with no evidence of malware infection, by fully copying valid data from the data blocks, in which case, if data cannot be restored from previous slices of the backup, the data is restored from the valid system image from which the system was deployed, or if such an image is not available, the data is restored from distributions, including the operating system distribution.

At step 206 all corrupted data and infected files are restored in all marked invalid data in the backup, thus ensuring the validity and completeness of the backup.

In a preferred embodiment, the backup is created with the ability to detect the sequence of changes made to data blocks by using a block map, with the files consisting of such blocks, and by tracking the sequence of block changes, it ensures that only changed files are scanned by the antivirus engine.

In one embodiment, the data backup agent performs the task of backing up user data according to a predefined schedule or when requested to perform another backup. The backup agent backs up the data blocks that make up the files and saves a slice of the backup to the cloud archive 103 or to the local archive 104 as shown in FIG. 1. A backup slice can be made by adding only the modified data blocks that have been made since the previous backup task was performed to the archive. A data backup agent is implemented with the ability to detect malware on a device using updated antivirus databases, with infected blocks marked as invalid and excluded from backups, while restoring the marked invalid data in the backup with the data contained in the detected backup with no evidence of malware infection, by fully copying the valid data from the block.

The backup slice thus predominantly contains the information data blocks that have been modified. If it is necessary to restore these data blocks and user files that have not been modified, the relevant data areas are retrieved from previous backups, up to the original backup, which stores the status of the files and data blocks at the time the backup task was first performed.

Figure 3:
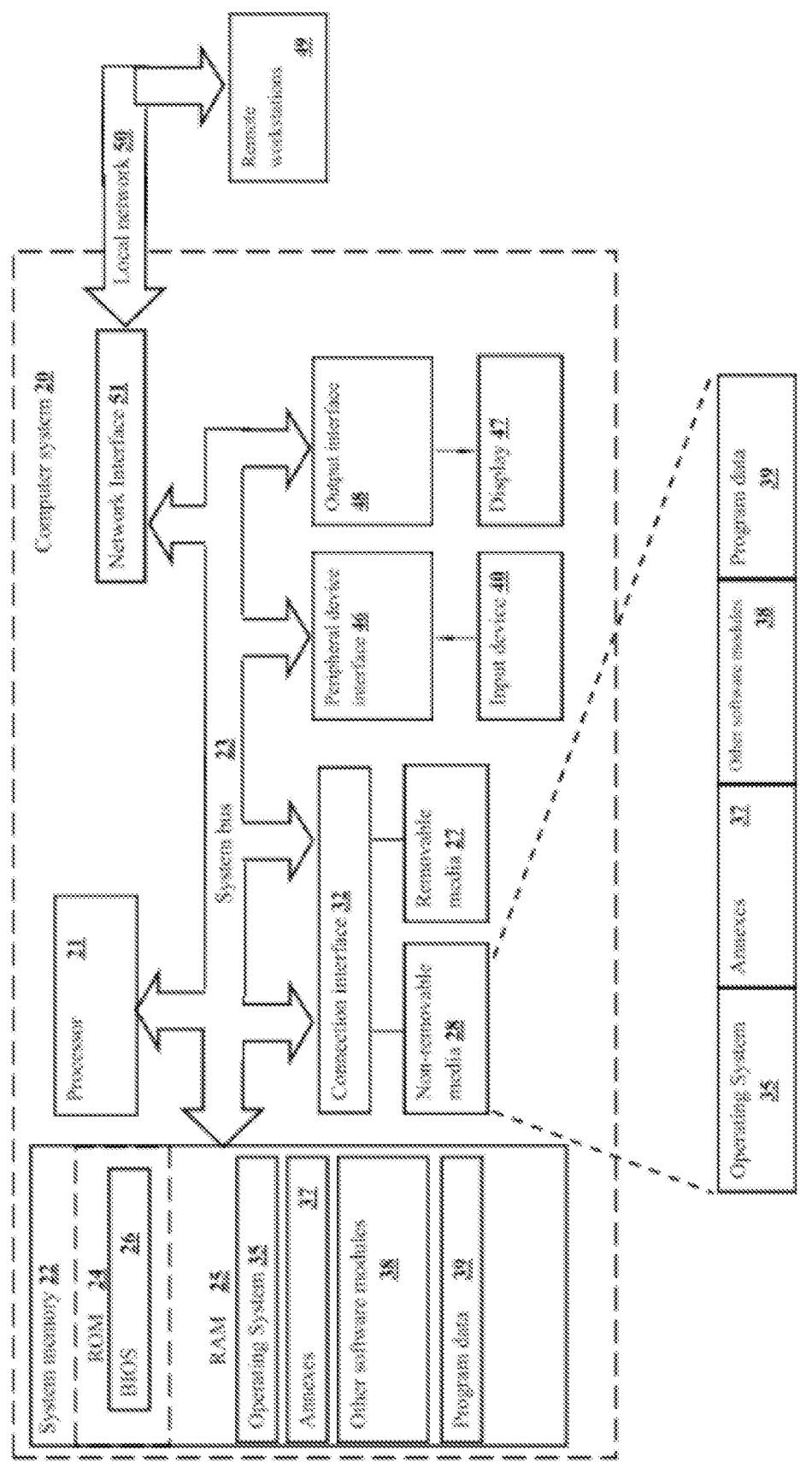
FIG. 3—shows an example of a general-purpose computer system on which the invention can be implemented.

FIG. 3 shows an example of a general-purpose computer system, personal computer, or server 20, which implements the basic principles of the system and ways of enhancing the security of data storage by backing up modified data. When counteracting the introduction of malware into a computing device during a restore from a backup, computer system 20 corresponds generally to the components of backup parameter monitoring system 100 of FIG. 1.

Computer system 20 comprises a central processing unit (CPU) 21, a system memory 22 and a system bus 23 to which system components are connected, including the memory associated with the CPU 21. The system bus 23 is implemented by any bus structure containing a bus memory or bus memory controller, a peripheral bus and a local bus capable of interfacing to any other bus architecture. Some examples of such buses are PCI, ISA, PCI-Express, HyperTransport™, InfiniBand™, Serial ATA, and I2C.

CPU 21 contains one or more processors with one or more processing cores. CPU 21 executes one or more computer-executable instructions which together implement this invention. System memory 22 contains any memory for storing data and/or computer programs that run in the CPU 21. The system memory contains a read-only memory (ROM) 24, random access memory (RAM) 25. The Basic Input/Output System (BIOS) 26 contains basic procedures which enable the transfer of information between components of the personal computer 20, for example, at the time of booting the operating system using ROM 24.

Computer system 20 in turn contains one or more removable data carriers 27 for reading and writing data and one or more non-removable data carriers 28. Removable media 27 and non-removable media 28 are connected to the system bus 23 via a connection interface 32. Drives and associated computer media are non-volatile storage mediums for computer instructions, data structures, software modules and other data of the computer system 20.

System memory 22, removable storage medium 27, non-removable storage medium 28 can be implemented in various ways. Some options are, for example, SRAM, DRAM, zero capacitor RAM, twin transistor RAM, eDRAM, EDO RAM, DDR RAM, EEPROM, NRAM, RRAM, SONOS, and PRAM. Alternatively, the storage medium may be implemented by solid state drives (SSD), magnetic cassettes, magnetic tape, magnetic hard disk drive, magnetic floppy disk drive, optical compact disk drive (CD-ROM), or digital versatile disk drive (DVD). The choice of storage medium preferably optimizes the functions of data storage and subsequent reading by its compatibility with the hardware and software comprising computer system 20.

System memory 22, removable storage medium 27, and non-removable storage medium 28 of the computer system 20 are used to store the operating system 35, additional user programs and applications 37, additional software modules 38, and service program data 39. The computer system 20 contains a peripheral interface 46 for connecting data from input devices 40, such as keyboards, mouse, stylus, game controller, voice input device, touch panels, or other peripheral devices printer, scanner. I/O ports such as serial port, parallel port, universal serial bus (USB), and other peripheral device interfaces are used to connect these peripherals.

At least monitor or display 47 is used to display information to the user, and additional monitors, projectors or integrated displays can be used in addition. These output devices are connected to the system bus 23 via an output interface 48, such as a video adapter. In addition to the display 47, the computer system 20 is equipped with other peripherals such as loudspeakers and other audio-visual devices.

Computer system 20 is connected via a network connection to a network environment to which one or more remote workstations 49 are also connected. Workstations (or computers) 49 are local user computers or servers, which in turn can also be characterized by similar elements and subsystems as computer system 20. In the network environment of a computer network, various network equipment such as routers, network stations, peer-to-peer devices or other network points are used.

Computer system 20 contains one or more network interfaces 51 or network adapters for communicating and exchanging information with remote workstations 49 via one or more networks, such as Local Area Network (LAN) 50, Wide Area Network (WAN), Intranet and Internet. For example, network interface 51 can be implemented using Ethernet, Frame Relay, SONET or wireless communication interfaces.

Given this description and the illustrative material of this application, the person skilled in the art will understand exactly how the sub-assemblies of the system are to be connected in order to implement the disclosed technical solutions. Variations and alternative embodiments which fall within the general inventive concept described in the present application, but without violating the scope of the claims, are also clear to the skilled person.

The invention claimed is:

1. A system for increasing data storage security by backing up modified data comprising:
    a computer system comprising a processor and a plurality of independent operating systems;
    an archive storage medium, connected to the processor via a system bus;
    an archive access interface connected to the archive storage medium;
    a connection interface connected to the archive access interface, the connection interface further comprising an archive connection driver, wherein the archive connection driver is configured to use the connection interface to create a virtual storage medium, the virtual storage medium readable by a selected one of the plurality of independent operating systems and virtualize and mount historical backup data slices and a current backup data slice as the most recent backup data slice using the archive access interface connection to the archive storage medium to create a single recovered dataset in the virtual storage medium;
    wherein the plurality of independent operating systems are configured to perform a plurality of antivirus scanning algorithms on the single recovered dataset comprising virtualized and mounted historical backup data slices including the selected one of the plurality of independent operating systems on the virtual storage medium;
    wherein at least one of the plurality of operating systems is configured to remove malware found in the single recovered dataset comprising virtualized and mounted historical backup data slices as a result of the antivirus scanning;
    wherein at least one of the plurality of operating systems is further configured to repair infected data blocks in the single recovered dataset comprising virtualized and mounted historical backup data slices;
    wherein at least one of the plurality of operating systems is further configured to find a slice of the backup data in the single recovered dataset comprising virtualized and mounted historical backup data slices that is free from malware to act as a recovery point;
    wherein the plurality of operating systems is further configured to run an antivirus check for changes made to selected virtualized and mounted historical backup data slices in the single recovered dataset and configured to back up data blocks in the selected virtualized and mounted historical backup data slices that show no signs of malware infection; and
    wherein at least one of the plurality of independent operating systems is further configured to mark corresponding data blocks for recovery in the current backup data slice.

2. The system of claim 1, wherein the archive connection driver is configured to restore marked invalid data in the current backup data slice with the data contained in an older historical backup slice by copying valid data from the data blocks of the older historical backup slice.

3. The system of claim 2, wherein, the operating system is configured such that if the operating system cannot restore the current backup data slice from historical backup slices, then data is restored from a valid system image from which the system was deployed.

4. The system of claim 3, wherein if a valid system image is not available, the operating system is configured to restore the marked invalid data from distributions, including the operating system distribution.

5. The system of claim 4, wherein the archive connection driver is configured to fix corrupted data and infected files in the marked invalid data in the virtualized and mounted historical backup slices.

6. The system of claim 5, wherein an archive access interface with a data backup agent is configured to back up data on a predetermined schedule.

7. The system according to claim 6, wherein on request to perform another backup, the backup agent is configured to copy data blocks that make up the files under operating system control and saves a backup slice to a cloud archive or to a local archive.

8. The system of claim 7, wherein the data backup agent is configured to detect malware on a device using updated antivirus databases, with infected blocks marked as invalid and excluded from backups, while restoring the marked invalid data in the backup with data contained in the historical backup slices with no evidence of malware infection, by copying valid data from the data blocks.

9. The system of claim 8, wherein the data backup agent is configured to take the backup slice by adding to the archive only modified data blocks that have been added since the previous backup task, wherein the backup slice predominantly contains modified data blocks.

10. The system of claim 9, wherein the data backup agent is configured to restore unmodified data blocks and files, and wherein relevant data for restoration are obtained from virtualized and mounted historical backups or the current virtualized and mounted backup data slice, comprising backups storing the status of files and data blocks at the time the backup task was first performed.

11. The system according to claim 10, wherein a backup slice chain is configured to store the results of a first backup and all subsequent incremental data about the state of the files and data blocks at the times the backup slices were taken.

12. The system according to claim 11, wherein the plurality of independent operating systems comprise one or more virtualized operating systems.

13. A method of improving the security of data storage by backing up modified data in a computer system with a plurality of independent operating systems, wherein instructions are carried out by one or more central processors, comprising:
   connecting via an archive connection driver using an archive connection interface to a backup located on local storage medium or in the cloud;
   creating a virtual storage medium using the archive connection interface;
   creating, using the archive connection driver, a single recovered dataset comprising historical backup slices and a current backup slice as the most recent backup slice from the backup using the archive connection interface;
   running a plurality of antivirus scanning algorithms using a plurality of antivirus scanning engines, each engine installed on one of the plurality of operating systems, on one or more of the historical backup slices and the current backup slice, including an engine configured for the selected one of the plurality of independent operating systems on the virtual storage medium;
   performing an antivirus scan of the historical backup slices and the current backup slice on the virtual storage medium and, if malware is found, removing data affected by the malware on the virtual storage medium; and
   restoring corresponding data blocks in the current backup slice on the virtual storage medium.

14. The method of claim 13, further comprising making an antivirus check of earlier changes to the virtualized and mounted historical backup slices to detect a backup that shows no signs of malware infection.

15. The method of claim 14, further comprising:
   marking infected data blocks as invalid in a plurality of the virtualized and mounted historical backups and historical backup slices closest in time to the current backup slice; and
   restoring marked invalid data in the backup to the data contained in the virtualized and mounted historical backup slices with no evidence of malware infection, by copying valid data blocks in the virtualized and mounted historical backup slices and correcting corresponding data blocks in the backup.

16. The method of claim 15, further comprising restoring data from a valid system image from which the system was deployed if the data cannot be restored from the single recovered virtual storage medium comprising virtualized and mounted historical backup slices.

17. The method of claim 16, further comprising restoring corrupted data and infected files in marked invalid data in the single recovered virtual storage medium.

18. The method of claim 17, further comprising using a block map to create a backup with the ability to detect the sequence of changes made to data blocks with the files consisting of such blocks, and by tracking the sequence of block changes, whereby only changed files are scanned by the engine.

19. The method of claim 18, further comprising backing up user data on a predetermined schedule by way of a data backup agent, wherein the data backup agent performs the task of backing up user data on a predetermined schedule, wherein the data backup agent copies the data blocks that make up the files and saves a slice of the backup to a cloud archive or to a local archive.

20. The method of claim 19, further comprising taking the virtualized and mounted historical backup slices by adding to the archive only modified data blocks that have been added since the last backup task, wherein the slice backup predominantly contains the data blocks of information which have been modified, and when restoring those data blocks and user files which have not been modified, the relevant data areas are obtained from previous backups, up to the original backup, which stores the status of the files and data blocks at the time the backup task was first performed.

* * * * *